United States Patent [19]
Patzelt et al.

[11] Patent Number: 5,873,945
[45] Date of Patent: Feb. 23, 1999

[54] METHOD FOR RECOVERING A VOLATILE ORGANIC MATERIAL CONSISTING ESSENTIALLY OF CARBONYL COMPOUNDS FROM SOLVENT-IN-WATER EMULSIONS DERIVED FROM PAINT OVERSPRAY TREATMENT AND CAPTURE SYSTEMS

[75] Inventors: Robert R. Patzelt, Bloomfield Hills; Thomas Randazzo, Troy, both of Mich.

[73] Assignee: Nortru, Inc., Detroit, Mich.

[21] Appl. No.: 648,588

[22] Filed: May 16, 1996

[51] Int. Cl.[6] ............................................. B08B 7/04
[52] U.S. Cl. ............................ 134/12; 134/2; 134/4; 134/6; 134/10; 134/18; 134/26; 134/29; 134/32; 134/34; 134/38
[58] Field of Search ................................ 134/2, 4, 6, 10, 134/12, 18, 26, 29, 32, 34, 38

[56] References Cited

U.S. PATENT DOCUMENTS

| | | | |
|---|---|---|---|
| 3,878,029 | 4/1975 | Baird et al. | 159/6 WH |
| 4,399,706 | 8/1983 | List et al. | 73/708 |
| 4,750,274 | 6/1988 | Erdman, Jr. et al. | 34/39 |
| 4,750,919 | 6/1988 | Patzelt et al. | 55/45 |
| 4,826,324 | 5/1989 | Kunz et al. | 366/99 |
| 4,950,081 | 8/1990 | List | 366/85 |
| 5,147,135 | 9/1992 | List et al. | 366/303 |
| 5,200,104 | 4/1993 | Zuerner et al. | 252/170 |
| 5,223,141 | 6/1993 | Brown et al. | 210/634 |
| 5,254,256 | 10/1993 | Zuerner et al. | 210/639 |
| 5,407,266 | 4/1995 | Dotsch et al. | 366/97 |

Primary Examiner—Ardin H. Marschel
Attorney, Agent, or Firm—Young & Basile, P.C.

[57] ABSTRACT

A process for recovering quantities of carbonyl compound material from spent solvent-in-water emulsions derived from paint overspray treatment and capture systems in which the spent solvent-in-water emulsion is removed from the paint overspray treatment and capture system and fed into a reaction vessel. The reaction vessel employed includes an outer housing defining a reaction chamber and a plurality of mixing blades movably positioned in the reaction chamber. The surface area of the mixing blades are maintained at a temperature sufficient to generate volatilized carbonyl compound. The interior of the reaction vessel is maintained under a vacuum. The spent solvent-in-water emulsion is processed in the reaction vessel for an interval sufficient to generate volatilized carbonyl compound. The generated volatilized carbonyl compound material is removed from the reaction vessel for recycle and reuse and the residual solid material remaining in the reaction vessel after generation of the volatilized carbonyl compound material is removed. The spent solvent-in-water emulsion which can be treated by the solvent recovery process of the present invention contains carbonyl compounds selected from the group consisting of secondary alcohol esters, secondary alcohol ester derivatives, and mixtures thereof and has a boiling point of at least 150° C., a vapor pressure between about 0.5 Torr at 20° C. The spent solvent-in-water emulsion processed by the carbonyl recovery method can either be previously dewatered to produce a spent solvent-in-water emulsion material with little or no water remaining or can be processed with most or all of the water portion of the emulsion present. In such instances, the water portion may be con-generated with the carbonyl compound.

28 Claims, 2 Drawing Sheets

METHOD FOR RECOVERING A VOLATILE ORGANIC MATERIAL CONSISTING ESSENTIALLY OF CARBONYL COMPOUNDS FROM SOLVENT-IN-WATER EMULSIONS DERIVED FROM PAINT OVERSPRAY TREATMENT AND CAPTURE SYSTEMS

BACKGROUND OF THE INVENTION

1. Field of the Invention

This invention pertains to a process for recovering volatile organic materials consisting essentially of carbonyl compounds from spent solvent-in-water emulsions derived from paint overspray treatment and capture systems. More specifically, this invention pertains to a process whereby carbonyl compounds are recovered from spent solvent-in-water emulsions derived from paint overspray treatment and capture systems in a manner which permits their successful reuse.

2. Discussion of the Relevant Art

Operation of paint spray booths using solvent-in-water emulsions which permit the collection of hydrocarbon emissions from paint solvents, solubilizing various types of paints, and dispersion and collection of both solubilized and non-solubilized solids has been set forth in numerous references. Discussion of formulations employing carbonyl compounds in solvent-in-water emulsions for use in paint spray booths is discussed in U.S. Pat. Nos. 5,198,143; 5,397,496, 5,200,104 and 5,254,256 all to Zuerner et al, the specifications of which are incorporated by reference in this document.

Solvent-in-water emulsions employed in the paint spray booths serve as a replacement for a conventional water system and act as a collection medium for hydrocarbon vapors and for paint overspray. The paint overspray contacts the solvent-in-water circulating in the paint spray booth. The material is solubilized and the paint solids are dispersed within the solvent-in-water emulsion. The paint solids are recirculated within the solvent-in-water emulsion until the solvent-in-water emulsion is separated from the paint spray booth system. Spent solvent-in-water emulsions containing paint solids are chemically broken or allowed to break into separate phases as parts of the recovery process. These separated phases are generally an organic phase containing solubilized paint solids and an aqueous phase. The separated phases are then treated and reused or disposed of as appropriate. For instance, Patzelt U.S. Pat. No. 4,919,691 suggests the use of recovered aqueous portions of spent emulsion in recycled solvent-in-water emulsion materials. However, no effective method of direct, efficient recovery of the organic solvent portion of spent solvent-in-water emulsions has been discovered to date.

It is well-accepted that recovery of the organic solvent component from spent solvent-in-water emulsions derived from the overspray treatment and capture system is necessary and desirable to maximize efficiency and economy in the overall paint overspray treatment process. The recovered organic solvent component should be suitable for reuse in the paint overspray treatment and capture system. However a significant portion of the organic solvent component has remained unrecoverable due to the presence of and interaction with paint solids during the recovery process. The paint solids in the spent emulsion make it difficult to effectively recover any significant amount of relatively pure organic solvent. Separation of the organic solvent component from the paint solids was so difficult because a large portion of the solvent remained bonded with the paint solids and was essentially non-recoverable.

Various techniques have been suggested for separating solvent from spent solvent-in-water emulsions derived from paint overspray treatment and capture systems. In these techniques, the presence of paint solids derived from the paint overspray treatment system creates problems of solvent retention and thermal decomposition of the paint solids during recovery processes. Temperatures necessary to accomplish volatilization of the organic solvent have resulted in uneven solidification of the paint solids thereby trapping a significant amount of the organic solvent in the solidifying paint solids mass. Additionally, the processing temperatures necessary to volatilize the organic solvent has also resulted in thermal decomposition of the paint solids. The thermally decomposed solids are difficult not only to remove from any reaction vessel but also to handle once removed.

Thus, it is desirable to provide a process whereby organic carbonyl compound materials can be efficiently and successfully recovered from spent solvent-in-water emulsion systems derived from paint overspray treatment and capture systems. It is also desirable to provide a process in which carbonyl compound materials such as secondary alcohol esters and secondary alcohol ester derivatives can be recovered in a continuous manner without causing the thermal decomposition of remaining solid compounds.

SUMMARY OF THE INVENTION

The present invention is a process for recovering significant quantities of volatile carbonyl compound material from spent solvent-in-water emulsions derived from paint overspray treatment and capture systems. The recovery process of the present invention comprises the following steps:

(a) removing the spent solvent-in-water emulsion containing the volatile carbonyl compound from the paint overspray treatment and capture system;

(b) feeding the removed spent solvent-in-water emulsion into a reaction vessel, the reaction vessel comprising an outer housing defining a reaction chamber and a plurality of mixing blades in the reaction chamber. The mixing blades have at least one surface in contact with the spent solvent-in-water emulsion. The reaction vessel also includes means for maintaining a temperature on the surface of the mixing blades sufficient to volatilize the carbonyl compound and means for producing a pressure less than 100 mm/Hg absolute in the reaction vessel;

(c) maintaining the spent solvent-in-water emulsion in the reaction vessel for an interval sufficient to generate volatilized carbonyl compound;

(d) removing the generated volatilized carbonyl compound material from the reaction vessel; and (e) removing residual material remaining in the reaction vessel after generation of the volatilized carbonyl compound material, the residual material consisting essentially of organic materials derived from paint solids and inorganic materials present in the paint.

The spent solvent-in-water emulsion which can be treated by the solvent recovery process of the present invention is one which initially comprises:

(a) 1–50 weight percent of carbonyl compound having a boiling point of at least 150° C., a vapor pressure less than 0.5 Torr at 20° C.; and (b) water.

The carbonyl compound component of the spent solvent-in-water emulsion by the process of the present invention to be removed is selected from the group consisting of secondary alcohol esters, secondary alcohol ester derivatives, and mixtures thereof.

It is to be understood that the process of the present invention can be performed on solvent-in-water emulsions in which the carbonyl compound and water are co-generated and can be separated in either concurrent or post process steps. It is also within the purview of this invention that some or all of the water component of the spent solvent-in-water emulsion may be removed prior to the process of the present invention.

BRIEF DESCRIPTION OF THE DRAWING

To further illustrate the present invention, the following drawing is presented in which like reference numerals are employed to designate various elements throughout the several drawing Figures and in which.

DESCRIPTION OF THE PREFERRED EMBODIMENT

The present invention is predicated upon the unexpected discovery that spent solvent-in-water emulsions containing carbonyl compounds selected from the group consisting of secondary alcohol esters, secondary alcohol esters derivatives and mixtures thereof, which are derived from paint overspray treatment and capture systems, can be processed at elevated temperature and negative pressure to remove and effectively recover the carbonyl compound. The solvent-in-water emulsion captures oversprayed paint and thereby paint solids which accumulate and increase as the solvent-in-water emulsion is circulated through the paint spray booth. During circulation, the emulsion collects, solubilizes, and suspends paint solids, thereby forming the spent solvent-in-water emulsion treatable by the process of the present invention. Thus, in certain applications dissociation of carbonyl compound from dissolved paint solids can present unique challenges to recovery of the carbonyl compound.

As employed herein the term "emulsion" is defined as the mixing of a liquid phase into another liquid phase. The term emulsion as used in this document includes both permanent emulsions, i.e. those characterized by particle diameters of 1 to 1.5 μm or less; and non-permanent emulsions, i.e. those characterized by particle diameters greater than 1 μm.

The spent solvent-in-water emulsion from which carbonyl compound is recovered has at least small amounts of paint solids dissolved therein. The term "dissolving" as employed herein is defined as a process which encompasses both dispersal and passing into solution, or solubilization of the solid component. The carbonyl compound itself is insoluble in aqueous media. The term "insoluble" is defined as having a solubility index of less than about 2 μg/liter.

The spent solvent-in-water emulsion is derived from paint spray booths of the type comprising a chamber or tank system, means for passing oversprayed paint particles through a liquid curtain and into the tank or chamber, the liquid containing the circulating solvent-in-water emulsion which receives the oversprayed paint particles. The solvent-in-water emulsion is comprised of:

(a) 1–50 weight percent of a carbonyl compound selected from the group consisting of secondary alcohol esters, secondary alcohol ester derivatives and mixtures thereof; and (b) water.

The solvent-in-water emulsion generally has a pH ranging between about 7.5–12.0 and is circulated through the paint spray booth for an interval sufficient to permit the emulsion to collect, solubilize and suspend oversprayed paint solids to form a spent solvent-in-water emulsion. The concentration of paint solids suspended in the solvent-in-water emulsion during operation of the paint overspray treatment and capture system can vary depending upon the duration and intensity of usage. The paint solid concentration can be any level as long as the spent solvent-in-water emulsion remains pumpable by conventional methods.

The volatilizable organic carbonyl compound which is recovered from the spent solvent-in-water emulsion is selected from the group consisting of secondary alcohol esters, secondary alcohol ester derivatives, and mixtures thereof. Preferably, the carbonyl compound is selected from the group consisting of carbonyl compounds having the general formula:

and mixtures thereof; wherein R' and R" are chosen from substituted and unsubstituted secondary alkyl groups having between 1 and 8 carbon atoms in the main chain; and R and R''' are chosen from linear or branched alkyl groups having between 1 and 10 carbon atoms wherein R and R''' may be either identical or different alkyl functionalities. In the preferred embodiment R' and R" are chosen from the group consisting of unsubstituted ethyl, propyl, butyl, pentyl, and hexyl functionalities as well as the mono-, di- and tri-alkyl substituted derivatives thereof such as methyl propyl, methyl butyl, ethyl butyl, methyl propyl, dimethyl butyl, dimethyl pentyl, or trimethyl pentyl functionalities. R and R''' are chosen from the group consisting of propyl, isopropyl, butyl, isobutyl, or t-butyl functionalities.

The preferred carbonyl compound generally has physical characteristics within the parameters set forth in Table I. Carbonyl compounds selected from the group consisting of 2,2,4-trimethyl-1,3-pentanediol monoisobutyrate, 2,2,4-trimethyl-1,3-pentanediol diisobutyrate, and mixtures thereof are preferred.

TABLE I

| PHYSICAL CHARACTERISTICS OF HYDROCARBON | |
|---|---|
| Boiling Point | 200° to 300° C. (at standard pressure) |
| Specific gravity (20° C.) | 0.94 to 0.955 |
| Water solubility | Insoluble |
| Viscosity (20° C.) | 8 to 14 cP |
| Vapor Pressure | <0.01 min Hg (at 20° C. and 1 atm) |

In the present invention, the carbonyl compound material is recovered from spent solvent-in-water emulsions derived from a paint overspray treatment and capture system by a method comprising the following steps:

(a) removing the spent solvent-in-water emulsion or at least a portion thereof from the paint overspray treatment and capture system;

(b) feeding the removed spent solvent-in-water emulsion into a reaction vessel, the reaction vessel comprising an outer housing defining chamber and a plurality of mixing blades movably positioned in the reaction chamber, the mixing blades have at least a portion of their surface in contact with the spent solvent-in-water emulsion, the reaction vessel further comprising means for maintaining the temperature of the surface area on the mixing blades sufficient to volatilize the carbonyl compound and means for producing a pressure less than about 100 mm/Hg absolute in the reaction vessel;

(c) maintaining the spent solvent-in-water emulsion in the reaction vessel for an interval sufficient to volatilize the carbonyl compound;

(d) removing the volatilized carbonyl compound material from the reaction vessel; and (e) removing any residual material remaining in the reaction vessel after volatilization of the carbonyl compound, the residual material consisting essentially of organic and inorganic materials derived from paint solids.

In the process of the present invention, carbonyl compound and water may be co-generated and the carbonyl compound and water may be separated in additional post processing steps. It is also within the purviews of the process of the present invention to process spent solvent-in-water emulsion from which some or all of the water has been removed.

The solvent-in-water emulsion from which the carbonyl compound is to be recovered by the process of the present invention may include other optional components such as surfactants, emulsifiers and the like. It is anticipated that these optional components of the solvent-in-water emulsion will be processed along with the spent solvent-in-water emulsion.

In the process of the present invention, the spent solvent-in-water emulsion can be introduced into the reaction vessel essentially in the form in which it is removed from the paint overspray treatment and capture system. In such situations, the spent solvent-in-water emulsion can have a carbonyl compound concentration between about 1 weight percent and about 50 weight percent.

The carbonyl compound process of the present invention can also include an optional step in which at least a portion of the aqueous component of the solvent-in-water emulsion is removed prior to introduction of the spent solvent-in-water emulsion material into the reaction vessel. The de-watering step can be accomplished by any suitable means such as breaking the emulsion into its aqueous and organic phases and decanting or otherwise removing at least a portion of the aqueous phase from contact with the organic phase. The emulsion can be allowed to break spontaneously, if possible, or more likely, can be broken by suitable mechanical or chemical means. Examples of processes involving breaking of solvent-in-water emulsions used with paint overspray treatment and capture systems by acidification of the emulsion are outlined in U.S. Pat. Nos. 4,814,092 and 4,919,691 both to Patzelt et al and U.S. Pat. Nos. 5,198,143; 5,200,104; 5,254,256 and 5,397,496 all to Zuerner et al. Other methods such as ultrafiltration, distillation or the like can be used to accomplish de-watering.

In instances in which the spent solvent-in-water emulsion is subjected to a de-watering step prior to introduction into the reaction vessel, it is to be understood that the relative concentration of recoverable solvent in the spent solvent-in-water emulsion material introduced therein can be significantly higher than previously indicated. Where the spent solvent-in-water emulsion is de-watered, the concentration of solvent in the spent solvent-in-water emulsion material introduced into the reaction vessel can be as high as 85–90 weight percent; with solvent concentrations between about 30 and about 60 weight percent being typical.

The process of the present invention can also include the optional step of generating volatilized aqueous fluid from the solvent-in-water emulsion contained within the reaction vessel. The aqueous fluid can be co-generated with the volatilized carbonyl compound or can be generated in a separate step such as an incremental heating process in which a major portion of the aqueous material is volatilized prior to volatilization of the carbonyl compound component. In situations where the carbonyl compound and water are co-generated, the recovery process of the present invention contemplates the further step in which the organic and aqueous materials are either allowed to separate and are decanted or are actively separated by suitable mechanical or chemical process as would be known to those skilled in the art.

Spent solvent-in-water emulsions from which carbonyl compound is recovered in the process of the present invention are derived from paint overspray treatment systems. As such, these spent emulsions contain solid components derived from paint overspray including, but not limited to, resinous binders, fillers, and adhesives, as well as pigments, preservatives, texture enhancing agents and the like. Collectively, these materials are referred to as "paint solids". The paint solids component of the spent solvent-in-water emulsion is generally contained in a dissolved state in the emulsion.

In paint overspray treatment solutions typically employed in paint overspray treatment and capture systems, the carbonyl compound material is present in amounts between 5% and 50% by composition volume, with amounts between about 5% and about 30% being typical and amounts between about 12% and 18% by composition volume being preferred. The balance of the overspray treatment material consists essentially of water. When employed in overspray treatment operations, the carbonyl compound material is dispersed in the aqueous phase in an emulsion or emulsion-like fashion. When the emulsion is broken, the carbonyl compound material preferentially forms the organic phase due to its inherent insolubility in water. Thus, the carbonyl compound material is preferentially located in the organic phase along with the paint solid components and any other organic materials after emulsion break. If desired, the aqueous phase can be separated from the organic phase prior to processing to increase efficiency of the recovery process.

The process stream from which the carbonyl compound is to be recovered by method of the present invention may typically contain between 25 and 40% by volume water. Because the process stream is generally derived from the breaking of spent solvent-in-water emulsions by acidification or other suitable procedures, significant amounts of water can remain in the process stream. The process stream can be introduced directly into the reaction-vessel or can be processed to remove significant amounts of water and water-soluble organic and inorganic compounds prior to volatilization of the carbonyl compound. Examples of such dewatering processes include distillation, ultrafiltration and the like as mentioned previously. It is to be understood that the de-watering step is optionally employed to provide increased efficiency in the process of the present invention.

In the process for recovering organic solvent from the spent solvent-in-water emulsion derived from paint overspray treatment and capture systems, the spent emulsion removal step may be accomplished in any suitable manner such as by pumping, gravity feed or the like. It is within the purview of this invention to feed spent solvent-in-water emulsion from the overspray treatment system directly to a suitable reaction vessel located proximate to the overspray treatment system or to collect the spent solvent-in-water emulsion in suitable holding tanks or other devices for transport and/or later processing. The optional de-watering step can be performed during or immediately after removal from the overspray treatment system to the reaction vessel or at any time while the spent solvent-in-water emulsion is collected in suitable holding tank devices. Alternately, the optional de-watering step can be performed at the outset of the solvent recovery process of the present invention once the spent solvent-in-water emulsion has been introduced into the reaction vessel.

It is anticipated that spent solvent-in-water emulsion can be removed from the overspray treatment and capture device on a continuous incremental basis during regular operation. It is also within the scope of this invention to completely remove essentially all spent solvent-in-water emulsion from the overspray treatment system as would occur during system shutdown or the like.

Thus, the process stream derived from paint overspray treatment operations from which the carbonyl compound material is to be recovered can contain carbonyl compound in amounts from about 5 to about 95% by volume depending upon the total volume of water and paint solids present. Where major concentrations of water have not been removed prior to processing, the carbonyl compound material may be present in the process stream in an amount between about 5% and about 50% by volume with amounts between about 12% and about 30% by volume being preferred.

When water is removed from the spent solvent-in-water emulsion, either prior to introduction into the reaction vessel or as a result of an initial evaporation step occurring in the reaction vessel, a fluid concentrate system is created of extremely low viscosity. This extremely low viscosity presents problems in attempting to process by known methods other than the method of the present invention. Without being bound to any theory, it is believed that characteristics of the concentrate derived from the spent solvent-in-water emulsion such as extreme fluidity are due to the presence of the carbonyl compound material for which recovery is sought.

In the process of the present invention, the spent solvent-in-water emulsion is heated to a temperature sufficient to volatilize the carbonyl compound component from the spent solvent-in-water emulsion. The process occurs under vacuum. In the preferred embodiment, the spent solvent-in-water emulsion is exposed to a temperature sufficient to effect rapid volatilization of the carbonyl compound component relative to the remaining spent emulsion material. The reaction temperature employed in the process of the present invention is sufficient to drive the carbonyl compound from contact with paint solid material. It has been found that initial amounts of carbonyl compound are driven off more readily than latter amounts. These latter amounts require greater driving force to separate from the paint solid matrix. Generally, the reaction temperature is equal to or greater than about 50° F. above the boiling point of the carbonyl compound at the given vacuum level, with the maximum reaction temperature limited at its upper range by the thermal decomposition temperature of paint solids present in the spent emulsion. Preferably, the reaction temperature is between about 50° F. and about 100° F. above the boiling point of the carbonyl compound to be recovered at the vacuum level employed. At a pressure of 20–40 mm/Hg absolute, a process temperature between about 450° F. and about 550° F. is preferred.

It has been discovered that when spent solvent-in-water emulsions containing carbonyl compounds such as those defined herein are exposed to the defined process temperatures under vacuum, the spent solvent-in-water emulsion exhibits carbonyl compound volatilization over a very narrow temperature gradient. This aids in ensuring recovery of carbonyl compound of significant purity as a result of the process of the present invention.

The recovery process of the present invention is carried out under vacuum to augment the generation of the volatilized carbonyl compounds. Preferably, the recovery process of the present invention occurs under pressure of 100 mm/Hg absolute; with a pressure between about 10 and 40 mm/Hg absolute being preferred.

In order to optimize recovery of the carbonyl compound from the spent solvent-in-water emulsion, the emulsion is agitated and mixed during the generation of the volatilized carbonyl compound. Preferably, the spent solvent-in-water emulsion is thoroughly agitated and admixed by a plurality of moving, heated agitation surfaces located in a reaction chamber defined by a reaction housing of the reaction vessel. The moving, heated agitation surfaces are preferably mixing blades having a plurality of surfaces in contact with the spent emulsion heated to a temperature sufficient to volatilize carbonyl compound from the spent solvent-in-water emulsion; the temperature is preferably at or above about 500° F.; with temperatures between about 450° F. and about 550° F. being most preferred when pressure values between 20–50 mm/Hg absolute are provided.

The mixing blades are preferably rotated by a device such as a motor capable of generating sufficient torque to mix solid and solidifying material formed in the reaction vessel during the recovery process. The surfaces of the rotating mixing blades and mating fixed surfaces located on the interior of the reaction vessel work in concert to mix and grind the spent solvent-in-water emulsion material being processed in the reaction vessel.

In the recovery process of the present invention, the spent solvent-in-water emulsion from which the volatilized carbonyl compound is generated passes through discrete physical transformation stages. To optimize carbonyl compound recovery, the reaction vessel employed will be capable of handling the introduced spent emulsion material as it passes through all or most of these stages.

The spent solvent-in-water emulsion introduced into the reaction vessel can be initially characterized as a pumpable liquid of average viscosity. Upon heating, the spent solvent-in-water emulsion evidences a marked drop in viscosity and behaves as a thin liquid. The material coalesces into a thick liquid over time with the volatilization and removal of the carbonyl compound. The thick liquid phase is characterized by a viscosity greater than or equal to the initial viscosity of the spent solvent-in-water emulsion as introduced into the reaction vessel.

As the carbonyl compound is volatilized, the material remaining in the reaction vessel becomes a highly, viscous pasty phase characterized by the presence of moist, malleable paste-like material. The material in the reaction vessel passes from the high viscosity pasty phase into a crusty phase as additional carbonyl compound is volatilized. The crusty phase is characterized by the formation of deposits of residual material on the heating elements which have an essentially dry outer surface area from which all or most of the carbonyl compound has been removed and an inner area in which carbonyl compound remains entrained with the paint solids.

As all or almost all of the carbonyl compound is volatilized, the material remaining in the reaction vessel experiences the formation of a solid phase. In the solid phase, the material remaining in the reaction vessel is an essentially dry, free flowing granular solid.

In the process of the present invention, the mixing elements of the reaction vessel are capable of adequately mixing and processing the spent solvent-in-water emulsion in all of these phases; particularly when the material is in the pasty or crusty solid phase.

The reaction vessel employed will, preferably, provide extensive heat transfer boundary surfaces on the mechanisms which provide the intensive mixing and grinding action in order to permit intense and rapid heat and vapor transfer. The volume and specific configuration of the reaction vessel can be modified to maximize heat transfer relative to the volume of the solvent-in-water emulsion to be processed and the desired processing time. It has been determined that processing intervals greater than about 15 minutes are generally required in order for the spent solvent-in-water emulsion to pass through the various phase changes and to generate sufficient volumes of volatilized organic solvent material. Processing intervals greater than about 30 minutes are generally preferred. The maximum processing interval is determined by factors such as the initial volume of spent solvent-in-water emulsion introduced into the reaction vessel, the desired percentage of solvent recovery sought, and the physical characteristics of the final solid phase. Ultimately, the solid phase remaining in the reaction vessel upon completion of the solvent recovery process will consist essentially of non-volatilized paint solids. Preferably, the resulting final phase solids will be in the form of an essentially free flowing granular material. Under normal operating conditions, the processing time in the reaction vessel is less than about 2 hours with a maximum processing time less than about 1 hour being preferred.

The solvent recovery process of the present invention, will also include means for providing a non-oxidative, preferably oxygen-free atmosphere in the reaction vessel. The non-oxidative atmosphere employed is one which will not support combustion under the defined process conditions. Gaseous materials of choice specifically include those which will prevent or deter burning of the paint solids and fires in the reaction vessel during the recovery process of the present invention. Suitable gaseous materials include but are not limited to, nitrogen, noble gases, and mixtures thereof. It is also within the scope of the invention to employ gases having trace amounts of oxidative material such as oxygen, provided the amount of oxidative material is below the flammability threshold at the reaction operating parameters.

Figure 1:
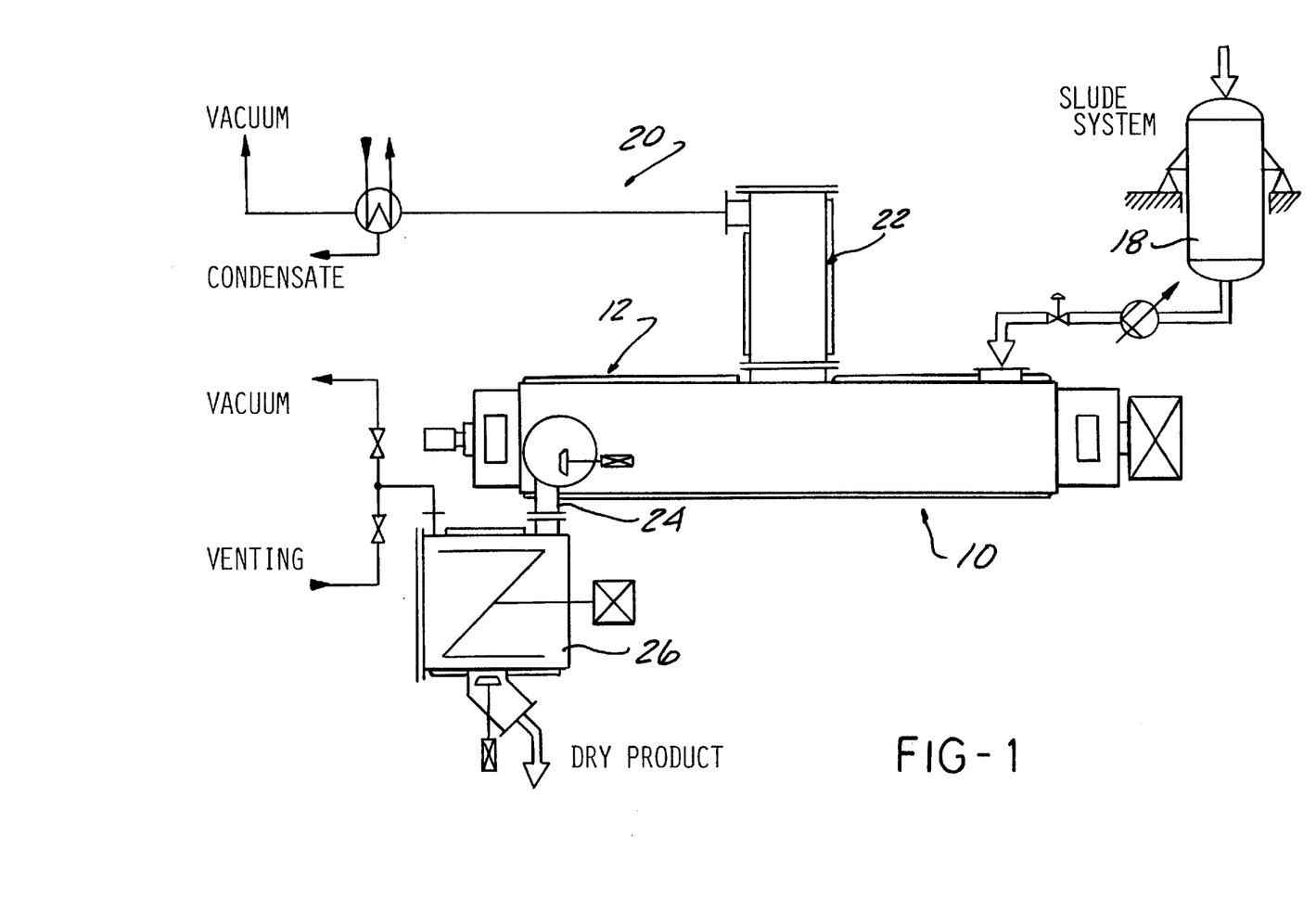
FIG. 1 is a cross-sectional view of a reaction vessel suitable for use in conjunction with the process of the present invention.
Figure 2:
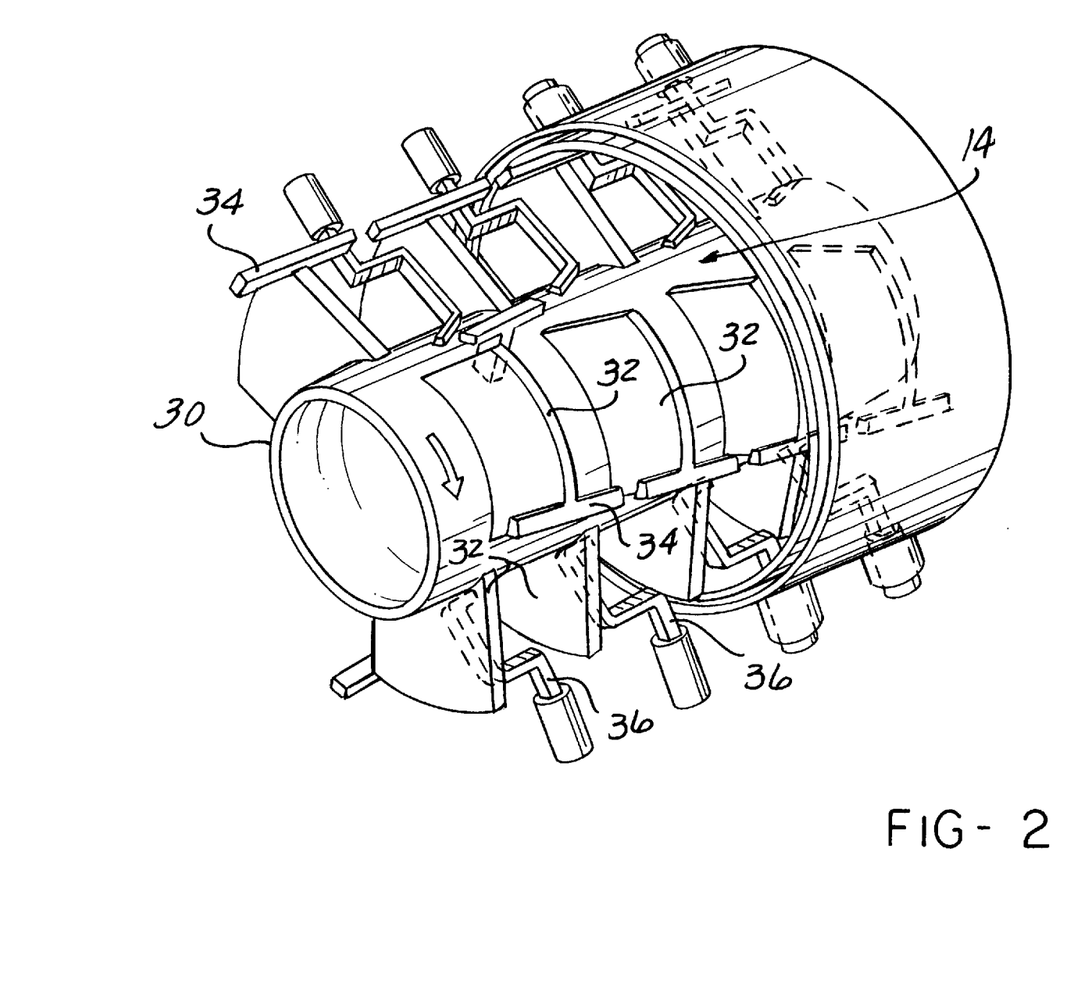
FIG. 2 is a detail view of suitable mixing discs employable in the process of the present invention.

As shown in FIGS. 1 and 2, a suitable processing device 10 can include a reaction vessel 12 containing a plurality of intermeshed rotating blades 14 which will be described in greater detail subsequently. Also included are means for heating the blade surfaces (not shown) and means for providing a vacuum within the reaction vessel 12 (not shown). The reaction vessel 12 also includes a suitable portal or portals 16 to permit entrance of the spent solvent-in-water emulsion into the vessel 12 from a suitable source such as feed tank 18. Also connected to the reaction vessel 12 is suitable means 20 for recovering the volatilized carbonyl compound. Suitable recovery means can include devices such as an overhead condenser 22. The final phase solid material is conveyed out of the reaction vessel 12 through a suitable exit portal 24 and can proceed into a suitable collection device via a discharger 26.

In order to achieve effective mixing and volatilization, the heat transfer surfaces of the reaction vessel 12 of the present invention are extensively swept to increase thermal efficiency and prevent the formation of large masses of pasty or crusty material. In order to accomplish this sweeping action, one suitable arrangement is shown in FIG. 2. Rotary shaft 30 includes a plurality of outwardly extending discs 32 in radial relationship therealong. Positioned on the outward edge of each disc 32 is a lateral mixing/kneading bar 34. A plurality of counterhooks 36 are positioned on the interior of the vessel housing to sweep the surface of the associated discs 32 to provide continuous cleaning of the heating surfaces. To increase the efficiency of the heating process, the additional surface of the reaction vessel can also be heated if desired. Suitable reaction vessels having the features described are commercially available from numerous sources. Such reaction vessels will minimally include an outer housing, a plurality of intermeshing mixing discs centrally located on at least one rotated shaft, means for heating the shaft to a temperature between about 450° F. and about 550° F. and means for drawing a vacuum within the reaction vessel. Examples of reaction vessels having suitable blade systems are found in U.S. Pat. No. 5,407,266 to Dotsch et al., U.S. Pat. No. 5,147,135 to List et al., U.S. Pat. No. 4,826,324 to Kunz et al., the relevant portions of the specifications of which are incorporated herein by reference. These systems include a plurality of blades positioned on a rotary shaft and can provide sufficient shearing and mixing immediately proximate to the blade surfaces so that solidifying paint solid masses formed on and near the blade surfaces can be systematically ground and removed from contact with the blade surface. The shaft rotates at a shaft speed sufficient to maintain the spent solvent-in-water emulsion in an agitated state during residence in the reaction vessel. Preferably, the shaft rotates at a speed between about 2 and about 30 rpm, with a shaft speed between about 15 and about 20 rpm being preferred. The rotational speed and the blade configuration create intensive kneading and mixing action in the spent solvent-in-water emulsion residing in the reaction vessel. The continuous kneading and grinding breaks up solid masses of paint solid residue as they form. By "breaking up" the solid masses, internal pasty portions which may be present in the solid masses are exposed to the blade surfaces so that the carbonyl compound contained therein can be volatilized. This precess occurs under vacuum to maximize volatilization of the carbonyl compound together with the formation of dry suitable final phase solids.

Solid resin residue resulting as a by-product of the carbonyl compound recovery process can be collected separately and has, as its major portion, high molecular weight polymers and resins derived from the paint solids.

Such residue typically can be characterized as dry granular material. The solid resin residue produced in the process of the present invention can be readily and easily handled for disposal, subsequent post processing treatment or use as raw material.

Without being bound to any theory, it is believed that processing the spent solvent-in-water emulsion derived from paint overspray treatment and capture systems under vacuum at the defined temperatures with agitation promotes the diffusion of the carbonyl compound component from the spent emulsion material and generation as a volatilized material. Heating the extensive surface area of the mixing surfaces provides rapid, systematic volatilization of the carbonyl compound component and initiates the solidification of the solid or solidifiable resinous paint components in the process stream as the carbonyl compound is volatilized. Continued agitation maintains the turbulent action of the solvent-in-water emulsion during processing and prevents the accumulation of solids on the heating elements and the formation of accumulated material having an outer crusty surface which prevents diffusion of the carbonyl compound therefrom. This also helps to prevent thermal decomposition of the solid or solidifiable paint components present in the process stream.

The process of the present invention may also include an optional preheating step in which the spent solvent-in-water emulsion derived from paint overspray treatment and capture systems is exposed to a temperature greater than about 100° C. for an interval sufficient to drive off at least a portion of the water and any light ends solvents which may be present in the spent solvent-in-water emulsion. The pre-heat temperature is preferably in a range which will permit volatilization of water and light ends solvents without compromising the integrity of the carbonyl compound and paint solids which remain. Preferably, this pre-heat temperature is between about 90° C. and about 150° C. The pre-heat interval can be adjusted to optimize the removal of volatilizable materials such as light ends solvents, water and the like.

As processed, the resulting solid by-product is a material which consists essentially of resinous material in essentially granular form. The term "essentially granular material" as used herein is defined as a solid particulate pourable material. It is to be understood that the essentially granular material produced as a by-product of the present invention will have chemical characteristics which are dependant upon the initial composition of the paint solid material in the spent solvent-in-water emulsion. It is to be understood that the paint solid components can vary depending upon the initial nature of the paint treated by the overspray treatment process from which the spent solvent-in-water emulsion is derived.

The volatilized carbonyl compound material recovered by the process of the present invention can be condensed and reused in suitable applications. The carbonyl compounds recovered remain essentially unchanged as a result of the process of the present invention. Thus, these recovered materials can be employed successfully in processes such as those outlined in the various Zuerner patents previously discussed.

In order to more fully understand the process of the present invention, the following illustrative examples are provided. These examples are to be considered illustrative of the present invention and in no way limit the scope or breadth of the invention herein claimed.

EXAMPLE I

An emulsion sample was collected from the material produced in the paint overspray process as outlined in U.S. Pat. No. 5,198,143 employing 2,2,4-trimethyl-1,3-pentanediol diisobutyrate. The sample material was acidified to break the emulsion. Twenty grams of the organic phase was heated on a hot plate to evaporate all volatile components. The vapors from the concentrate were passed through a condenser where the volatile components were condensed and collected. The organic layer from the condenser was analyzed and determined to be 78% 2,2,4-trimethyl-1,3-pentanediol diisobutyrate, the main constituent of the overspray treatment emulsions.

EXAMPLE II

Two hundred grams of a composite sample of concentrate collected by the process outlined in Example I was placed in a 500 ml round bottom flask along with 83 ml mineral oil. Mineral oil was used to prevent hardening of the resins present in the sample during the test. The mixture was heated to 220° F. in a 28 inch vacuum. Under these conditions the diisobutyrate component and some of the oil were found to be volatile. The vapors from the experiment were condensed and collected. The organic layer weighed 93 gm and was analyzed and found to contain diisobutyrate. Calculated diisobutyrate recovery was 30.5 gm. The concentrate was analyzed as 17.1 gm diisobutyrate, thus recovery was 90%.

EXAMPLE III

A test run of spent solvent-in-water emulsion processed in the manner outlined in Example I was processed in a conventional auger type dryer such as that disclosed in U.S. Pat. No. 4,750,274 to Erdman, the specification of which is incorporated by reference herein. The overheads were collected and visually inspected. The overheads were dark and had a burnt odor indicating thermal decomposition of the resin was occurring in addition to any volatilization of the carbonyl compound component.

EXAMPLE IV–IX

Six batch trials were conducted to determine the efficiency of carbonyl compound recovery using a continuous vacuum drying kneader mixing device. The process parameters are set forth in Table II. Fixed amounts of water, paint-derived solid, and the carbonyl compound 2,2,4-trimethyl-1,3-pentanediol diisobutyrate were employed and are set forth in Table III.

TABLE II

TEST PROCESS PARAMETERS

| | | | | Feed (lb/%) | | | |
|---|---|---|---|---|---|---|---|
| Run No. | Process Temp. (F.) | Process Pressure (mm Hg) | Shaft Speed (RPM) | 2,2,4 Trimethyl 1,3 Pentanediol Diisobutyrate | Water | Solids | Total |
| 1 | 392 | 0.8 | 30 | 2.70/24.5 | 4.15/ 37.7 | 4.17/ 37.8 | 11.02 |
| 2 | 502 | 18.8 | 30 | 4.90/24.5 | 7.55/ 37.7 | 7.57/ 37.8 | 20.02 |
| 3 | 502 | 33.8 | 30 | 4.90/24.5 | 7.54/ 37.7 | 7.56/ 37.8 | 20.00 |
| 4 | 502 | 84.0 | 45 | 4.95/24.5 | 7.62/ 37.7 | 7.64/ 37.8 | 20.20 |
| 5 | 590 | 510.0 | 45 | 4.90/24.5 | 7.54/ 37.7 | 7.56/ 37.8 | 20.00 |
| 6 | 300 | 0.8 | 45 | 3.66/18.3 | 7.80/ 39.0 | 8.56/ 42.8 | 20.00 |

TABLE III

PRODUCT RECOVERY AFTER PROCESSING

| Run No. | Condensate Water Phase (lb) | Water Recovery (%) | Condensate Organic Phase (lb) | Organic Phase 2,2,4 Trimethyl 1,3 Pentanediol Monoisobutyrate (lb/%) | Organic Phase Other (lb) | 2,2,4-DIISO Recovered (%) |
|---|---|---|---|---|---|---|
| 1 | 3.31 | 79.7 | 1.19 | 1.05/88.0 | 0.14 | 38.8 |
| 2 | 7.34 | 97.3 | 5.79 | 4.90/85.1 | 0.86 | 100 |
| 3 | 6.17 | 81.3 | 5.93 | 4.62/77.9 | 1.31 | 94.3 |
| 4 | 6.55 | 86.0 | 3.65 | 2.87/78.5 | 0.78 | 57.9 |
| 5 | 6.76 | 89.7 | 4.85 | 0.4/80.7 | 0.10 | 11.2 |

| Run No. | Total Condens. Calc. (lb) | Condens. Recovery (%) | Solids (lb) | Solids 2,2,4 Trimethyl 1,3 Pentanediol Diisobutyrate (lb/%) | 2,2,4-DIISO Recovery (%) | Solids Recovery (lb/%) | Total 2,2,4-DIISO Recovery (lb/%) | Total Recovery % |
|---|---|---|---|---|---|---|---|---|
| 1 | 6.85 | 65.7 | 2.85 | 0.05/1.72 | 1.5 | 2.80/67.2 | 40.3/7.35 | 66.7 |
| 2 | 12.45 | 105.2 | 5.50 | 0.02/0.29 | 0.2 | 5.48/72.5 | 100.2/18.6 | 92.6 |
| 3 | 12.44 | 97.3 | 5.55 | 0.04/0.74 | 0.7 | 5.51/72.9 | 95.0/17.65 | 88.3 |
| 4 | 12.56 | 81.2 | 7.30 | 0.52/7.11 | 7.9 | 6.78/88.8 | 65.9/17.5 | 86.6 |
| 5 | 12.44 | 93.3 | 6.72 | 0.53/7.95 | 7.9 | 6.19/81.8 | 78.5/18.33 | 91.7 |
| 6 | 11.46 | 71.0 | 6.34 | 0.03/0.41 | 0.3 | 6.31/73.8 | 11.6/14.48 | 72.4 |

What is claimed is:

1. In a process for containment and removal of oversprayed paint particles generated in paint spray booths, the paint spray booth of the type comprising (a) a tank chamber; (b) means for passing oversprayed paint particles through a liquid curtain and said tank chamber; (c) a sump located at the bottom of said tank chamber, the sump containing a solvent-in-water emulsion which circulates through the spray booth and receives said oversprayed paint particles, said solvent-in-water emulsion comprised of:

1–50 weight percent of an organic liquid selected from the group consisting of secondary alcohol esters, secondary alcohol ester derivatives, and mixtures thereof, the organic liquid having a boiling point of at least 150° C., and a vapor pressure less than 0.5 Torr at 20° C.; and water, and said solvent-in-water emulsion having a pH ranging between about 7.0 and about 12.0, and wherein the solvent-in-water emulsion is circulated through the paint spray booth until the solvent-in-water emulsion collects, solubilizes, dispenses, and suspends said oversprayed paint particles, thereby forming a spent solvent-in-water emulsion containing the paint particles, water and the organic liquid, wherein the improvement to the paint overspray particle containment and removal process comprises a method for recovering the organic liquid component from the spent solvent-in-water emulsion, the organic liquid component recovery method comprising the steps of:

A) removing at least a portion of the spent solvent-in-water emulsion containing the organic liquid and paint particles and water from the paint spray booth;

B) feeding the removed spent solvent-in-water emulsion into a reaction vessel, the reaction vessel comprising an outer housing defining a reaction chamber and a plurality of mixing blades movably positioned in the reaction chamber, the mixing blades having at least one surface in contact with the spent solvent-in-water emulsion, the reaction vessel further comprising means for maintaining a surface area temperature on the mixing blades sufficient to generate volatilized organic liquid and means for producing a pressure less than about 100 mm/Hg absolute in the reaction chamber and an atmosphere inert to combustion of components of the solvent-in-water emulsion;

C) agitating the spent solvent-in-water emulsion in the reaction vessel in a manner which provides intimate contact between the mixing blades and the spent solvent-in-water emulsion;

D) maintaining the spent solvent-in-water emulsion in the reaction vessel for an interval sufficient to generate volatilized organic liquid separate from nonvolatile material containing paint particles;

E) removing the generated volatilized organic liquid from the reaction vessel; and

F) removing residual material remaining in the reaction vessel after generation of the volatilized organic liquid, the residual material being essentially dry and free of the volatile organic liquid and consisting essentially of materials granular particulate solids derived from paint particles.

2. The method of recovering the organic liquid from the spent solvent-in-water emulsion as defined in claim 1 wherein the organic liquid to be recovered contains as a major constituent a compound selected from the group consisting of:

carbonyl compounds having the general formula:

carbonyl compounds having the general formula:

mixtures thereof,
wherein R' and R" are chosen from the group consisting of substituted alkyl groups, unsubstituted alkyl groups and mixtures thereof, said substituted alkyl groups having from 1 to 8 carbon atoms, wherein R and R'" are chosen from the group consisting of linear alkyl groups having from 1 to 10 carbon atoms, branched alkyl groups having from 1 to 10 carbon atoms, R and R'" being either identical or different alkyl functionalities, said carbonyl compounds being capable of dissolving at least a minor portion of the solid compound while remaining essentially insoluble in and non-reactive with an aqueous media.

3. The organic liquid recovery method of claim 1 wherein the organic liquid component is a carbonyl compound is selected from the group consisting of 2,2,4-trimethyl-1,3-pentanediol monoisobutyrate, 2,2-4-trimethyl-1,3-pentanediol diisobutyrate, and mixtures thereof.

4. The organic liquid recovery method of claim 1 wherein the pressure employed is between about 10 and about 40 mm/Hg absolute.

5. The organic liquid recovery method of claim 1 wherein the surface area temperature on the mixing blades is between 50° F. greater than the boiling point of the carbonyl compound at the pressure present in the reaction chamber and thermal decomposition temperature of paint solids contained in the spent solvent-in-water emulsion.

6. The organic liquid recovery method of claim 5 wherein the surface area temperature on the mixing blades is between about 50° F. and about 100° F. greater than the boiling point of the carbonyl compound at the pressure present in the reaction chamber.

7. The organic liquid recovery method of claim 1 wherein the pressure employed is between about 20 and about 50 mm/Hg absolute and wherein the spent solvent-in-water emulsion is agitated and intimately mixed during the temperature exposed by the mixing blades, the mixing blades having spent solvent-in-water emulsion contacting surfaces having surface temperatures between about 450° F. and about 550° F.

8. The recovery method of claim 1 wherein the solvent-in-water emulsion is maintained in the reaction vessel for an interval sufficient to co-generate water and volatilized carbonyl compound.

9. The organic liquid recovery method of claim 1 further comprising the step of removing at least a portion of the water contained in the spent solvent-in-water emulsion from contact therewith prior to introduction of the spent solvent-in-water emulsion into the reaction vessel.

10. The method of claim 9 further comprising the step of heating the spent solvent-in-water emulsion to a temperature sufficient to volatilize water, the heating step occurring prior to generation of the volatilized organic liquid.

11. The method of claim 1 wherein the means for agitating the spent solvent-in-water emulsion further comprises a plurality of mixing blades, the mixing blades having a surface area being heated to a temperature sufficient to volatilize the organic liquid component of the spent solvent-in-water emulsion and produce dry granular material derived from the solid component.

12. The method of claim 11 wherein the surface temperature of the mixing blades is between about 450° F. and about 550° F. and the pressure in the reaction vessel is between about 20 and about 50 mm/Hg absolute.

13. The method of claim 2 further comprising the step of:
directing at least a portion of the generated volatilized organic liquid removed from the reaction vessel in step E into a mechanism for ultimate reuse in a solvent-in-water emulsion for use in containment of oversprayed paint particles.

14. A process for recovering a carbonyl compound material from a spent solvent-in-water emulsion, the spent solvent-in-water emulsion containing, at least, the carbonyl compound, and solubilized paint solids having as a major constituent high molecular weight resins, the process comprising the steps of:
introducing the spent solvent-in-water emulsion into a reaction vessel, the reaction vessel comprising an outer housing, a plurality of mixing blades rotatably oriented within the outer housing in a manner which imparts turbulent agitation and shearing action in spent solvent-in-water emulsion located proximate to each respective blade, means for drawing a vacuum in the reaction vessel and means for heating the introduced solvent-in-water emulsion to a temperature sufficient to volatilize the carbonyl compound;

agitating the spent solvent-in-water emulsion in the reaction vessel for an interval sufficient to generate volatilized carbonyl compound and solid-by-product material, the volatilized carbonyl compound consisting essentially of a carbonyl compound selected from the group consisting of secondary propanol esters, secondary butanol esters, secondary pentanol esters, condensation products of a reaction between secondary propanol esters and carboxylic acid, condensation products of a reaction between secondary butanol esters and carboxylic acid, condensation products of a reaction between secondary pentanol esters and carboxylic acid, and mixtures thereof, the agitation step occurring in an atmosphere which minimizes combustion of the spent solvent-in-water emulsion;

condensing the volatilized carbonyl compound for recovery and reuse; and removing solid by-product material from the reaction vessel, the solid by-product material being an essentially dry granular material having as a major constituent high molecular weight resins.

15. The recovery process of claim 14 wherein the spent solvent-in-water emulsion is exposed to a reaction temperature between about 50° F. and about 100° F. greater than the boiling point of the carbonyl compound at the absolute pressure maintained in the reaction vessel during the agitation step.

16. The recovery process of claim 15 wherein the pressure in the reaction vessel is less than 100 mm/Hg absolute.

17. The recovery process of claim 15 wherein the pressure in the reaction vessel is between about 10 mm/Hg and about 40 mm/Hg absolute.

18. The recovery process of claim 14 wherein the spent solvent-in-water emulsion is exposed to a reaction temperature between about 450° F. and about 550° F. at a pressure between about 20 mm/Hg absolute and about 50 mm/Hg absolute.

19. The recovery process of claim 14 further comprising the step of separating excess water and trace amounts of water soluble organic compounds from the spent solvent-in-water emulsion prior to the temperature exposure step.

20. The recovery process of claim 14 wherein the carbonyl compound generated in the agitation step is selected from the group consisting of 2,2,4-trimethyl-1,3-pentanediol monoisobutyrate, 2,2-4-trimethyl-1,3-pentanediol diisobutyrate, and mixtures thereof.

21. The process of claim 14 further comprising the step of:
admixing at least a portion of the condensed volatilized carbonyl compound in water to form a fresh solvent-in-water emulsion suitable for use in paint spray booths for containment and removal of oversprayed paint particles.

22. A method for recovering carbonyl compounds from a spent solvent-in-water emulsion, the spent solvent-in-water emulsion containing, at least, paint solids, and the carbonyl compounds, wherein the carbonyl compounds selected from the group consisting of:

carbonyl compounds having the general formula:

carbonyl compounds having the general formula:

mixtures thereof,
the recovery process comprising the steps of:
A) introducing the spent solvent-in-water emulsion into a mechanical agitation device, the mechanical agitation device having extended surface area maintained at a temperature sufficient to generate volatilized carbonyl compound;
B) agitating the spent solvent-in-water emulsion in the mechanical agitation device for an interval sufficient to generate volatilized carbonyl compound material and dry particulate granular material consisting essentially of paint solids, the agitation step proceeding under a pressure between about 10 and about 50 mm/Hg absolute with a rotary speed of at least 2 rpm;
C) collecting the generated volatilized carbonyl compound; and
D) separately collecting the dry particulate granular material from which the carbonyl compound has been removed.

23. The recovery process of claim 22 wherein the agitation step comprises physically removing solid compound from proximity to the extended surface area in a continuous manner.

24. The recovery process of claim 22 wherein the carbonyl compound is selected from the group consisting of secondary propanol esters, secondary butanol esters, secondary pentanol esters, condensation products of a reaction between secondary propanol esters and carboxylic acid condensation products of a reaction between secondary butanol esters and carboxylic acid, condensation products of a reaction between secondary pentanol esters and carboxylic acid, and mixtures thereof.

25. The recovery process of claim 22 wherein the carbonyl compound is selected from the group consisting of 2,2,4-trimethyl-1,3-pentanediol monoisobutyrate, 2,2-4-trimethyl-1,3-pentanediol diisobutyrate, and mixtures thereof.

26. The recovery process of claim 22 wherein the temperature of the extended surface area is between about 50° F. to about 100° F. greater than the temperature at which the carbonyl compound boils at the pressure maintained during the agitation step.

27. The recovery process of claim 22 wherein the temperature of the extended surface area is between about 450° F. and about 550° F. and the pressure maintained during the agitation step is between about 20 and about 50 mm/Hg absolute.

28. The method of claim 22 further comprising the step of:
admixing at least a portion of the collected volatilized carbonyl compound with water to form a fresh solvent-in-water emulsion suitable for use in paint spray booths for containment and removal of oversprayed paint particles.

* * * * *